United States Patent
Denneman et al.

(10) Patent No.: US 8,198,398 B2
(45) Date of Patent: Jun. 12, 2012

(54) PROCESS FOR REMOVING FOULING

(75) Inventors: Marco Antonius Denneman, Amsterdam (NL); Willem Karzijn, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 13/140,856

(22) PCT Filed: Dec. 21, 2009

(86) PCT No.: PCT/EP2009/067699
§ 371 (c)(1),
(2), (4) Date: Aug. 2, 2011

(87) PCT Pub. No.: WO2010/076259
PCT Pub. Date: Jul. 8, 2010

(65) Prior Publication Data
US 2011/0275776 A1 Nov. 10, 2011

(30) Foreign Application Priority Data
Dec. 22, 2008 (EP) .................................... 08172595

(51) Int. Cl.
*C08F 6/00* (2006.01)
*B08B 9/00* (2006.01)
*C08F 2/00* (2006.01)

(52) U.S. Cl. ............... 528/484; 134/22.19; 510/499; 525/31; 525/39; 525/437; 525/438; 526/74

(58) Field of Classification Search ............... 528/484; 526/74; 134/22.19; 510/499; 525/31, 39, 525/437, 438
See application file for complete search history.

(56) References Cited

U.S. PATENT DOCUMENTS

| | | | | |
|---|---|---|---|---|
| 2,106,513 | A | * 1/1938 | Allison | 514/634 |
| 4,904,309 | A | * 2/1990 | Komabashiri et al. | 134/42 |
| 2007/0129461 | A1 | 6/2007 | Fyles | 523/122 |

FOREIGN PATENT DOCUMENTS

| | | |
|---|---|---|
| EP | 0557120 | 2/1993 |
| JP | 56014506 | 2/1981 |
| JP | 2000128717 | 5/2000 |
| WO | WO9940144 | 8/1999 |
| WO | WO03097712 | 11/2003 |
| WO | WO2008122581 | 10/2008 |

* cited by examiner

*Primary Examiner* — Fred M Teskin

(57) ABSTRACT

The invention relates to a process for removing fouling on a surface, wherein the surface is contacted with an aqueous solution of a guanidine of formula $$R^1R^2N\text{—}C(\text{=}NH)\text{—}NR^3R^4 \qquad (I)$$

wherein $R^1$, $R^2$, $R^3$ and $R^4$ may be the same or different and each of $R^1$, $R^2$, $R^3$ and $R^4$ is hydrogen or hydrocarbyl.

10 Claims, No Drawings

PROCESS FOR REMOVING FOULING

PRIORITY CLAIM

The present application claims priority from PCT/EP2009/067699, filed 21 Dec. 2009, which claims priority from European Application EP 08172595.4, filed 22 Dec. 2008.

FIELD OF INVENTION

The present invention relates to a process for removing fouling, and to a process for preparing a polymer polyol wherein fouling is removed by the former process.

BACKGROUND

In chemical processes where solid material is produced or used, solids may adhere to the interior walls of and any internals in the vessels wherein the chemical processes take place. Such adhesion can be so strong that after emptying the vessel, the solid material remains adhered to the interior walls as so-called fouling. Especially in batch or semi-batch processes, it is desired that before a next batch is performed all of the fouling is removed. Because new fouling material may adhere relatively fast to fouling that is already present (i.e. from a previous batch).

It is known to remove fouling by using cleaning agents, such as acetone. However, it was found that a fraction of a fouling may not be soluble in acetone so that a thin fouling layer stays behind to which new fouling material may adhere relatively fast. Especially, it has appeared that with acetone not all fouling can be removed in a case where the fouling is produced in a process for making polymer polyols, which are dispersions of solid polymer in a liquid polyol.

The object of the present invention is to find a cleaning agent which effectively removes the fouling produced in chemical processes as described above.

Surprisingly, it was found that an aqueous solution of a guanidine is such effective fouling removing agent.

SUMMARY OF THE INVENTION

Accordingly, the present invention relates to a process for removing fouling on a surface, wherein the surface is contacted with an aqueous solution of a guanidine of formula

$$R^1R^2N-C(=NH)-NR^3R^4 \quad (I)$$

wherein $R^1$, $R^2$, $R^3$ and $R^4$ may be the same or different and each of $R^1$, $R^2$, $R^3$ and $R^4$ is hydrogen or hydrocarbyl.

In the present specification, fouling comprises solid material adhered to a solid surface.

DETAILED DESCRIPTION

In the present invention, the surface to which the fouling is adhered may be an exterior surface. It may also be an interior surface, for example the interior surface of the walls of a vessel. Said vessel may be a vessel wherein a dispersion of a solid material in a liquid is stored and/or formed. For example, said vessel may be a reaction vessel wherein the fouling to be removed in the present process, is produced in a chemical process wherein a dispersion of a solid material in a liquid is used and/or formed. In the latter case, the fouling may be adhered to the interior surface of the reactor vessel walls and/or any internals present in the reactor vessel.

Applying the present invention to a reactor vessel comprising fouling that is adhered to the interior surface of the reactor vessel walls and/or any internals in the reactor vessel, is advantageous in that the fouling is substantially completely removed whereas with other cleaning solvents still some fouling remains behind. By "substantially completely" removed it is herewith meant that more than 90 wt. % of the fouling, preferably more than 95 wt. %, more preferably more than 98 wt. %, more preferably more than 99 wt. %, more preferably more than 99.5 wt. %, and most preferably more than 99.8 wt. % of the fouling is removed.

In such reactor vessel comprising fouling, it is advantageous to remove as much fouling as possible since due to the cleaner reactor vessel heating of the reactor content is much faster which in turn results in a capacity increase for the reactor vessel. Because by reducing heating time more batches can be performed within the same time period.

Preferably, the fouling to be removed is produced in a process wherein a dispersion of a solid material in a liquid is used and/or formed. An example of a process wherein a dispersion of a solid material in a liquid is formed and wherein fouling is produced which can be removed by applying the present process, is a process for preparing a polymer polyol. Preferably, said polymer polyol is prepared by mixing a base polyol, one or more ethylenically unsaturated monomers, a polymerization initiator, optionally a macromer, and optionally a chain transfer agent, and polymerizing the mixture thus obtained at a temperature of 50 to 200° C.

Processes for preparing polymer polyols are for example disclosed in WO99/40144, WO03/097712 and WO2008/122581.

The pressure at which polymerization when preparing a polymer polyol, may be carried out, is suitably comprised in the range of from 0.01 to 5 bar absolute, more suitably 0.05 to 4 bar absolute.

The base polyol used preferably is a polyether polyol, also frequently referred to as polyoxyalkylene polyols. Such polyether polyols are typically obtained by reacting a starting compound having a plurality of active hydrogen atoms with one or more alkylene oxides, such as ethylene oxide, propylene oxide, butylene oxide or mixtures of two or more of these. Suitable polyether polyols are those having a nominal molecular weight in the range of from 350 to 15,000 and an average nominal functionality (Fn) of at least 2.0. It has been found particularly advantageous to use polyols having a molecular weight in the range of from 2000 to 14,000. Such polyols preferably further have a Fn in the range of from 2.5 to 6.0. The hydroxyl value of the polyol suitably has a value of from 10 to 150 mg KOH/g, more suitably of from 20 to 75 mg KOH/g. Examples of suitable polyols include CARADOL SC46-02, CARADOL SC36-13, CARADOL MC36-03, CARADOL SC56-02, CARADOL SC36-11, CARADOL SC48-03 and CARADOL MH56-03 (CARADOL is a trademark). Most preferably, CARADOL SC56-02 polyol and CARADOL SC48-03 polyol are used.

Suitable ethylenically unsaturated monomers for preparing the dispersed polymer include vinyl aromatic hydrocarbons, like styrene, alpha-methyl styrene, beta-methyl styrene and various other alkyl-substituted styrenes. Of these, the use of styrene is preferred. The vinyl aromatic monomer may be used alone or in combination with other ethylenically unsaturated monomers, such as acrylonitrile, methacrylonitrile, vinylidene chloride, various acrylates and conjugated dienes like 1,3-butadiene and isoprene. Preferred ethylenically unsaturated monomers to be used for the purpose of the present invention are styrene and acrylonitrile in a weight ratio of from 30:70 to 100:0. It is, however, particularly preferred to use styrene alone or a combination of styrene and acrylonitrile in a weight ratio styrene:acrylonitrile of from 50:50 to 75:25, resulting in the dispersed polymers polystyrene and styrene-acrylonitrile (SAN) copolymers, respectively.

Preferably, a macromer is fed when preparing the polymer polyol. Within the present specification, a macromer is considered to be a polyol which may contain one or more unsaturations and which purpose is to effect a stable dispersion of the polymer particles in the base polyol, said polymer particles obtained from polymerizing one or more ethylenically unsaturated monomers. Macromers which can be used include, but are not limited to the reaction product of a polyol with a reactive unsaturated compound such as maleic anhydride, phthalic anhydride, fumaric acid, 1,1-dimethyl-m-isopropenyl-benzyl-isocyanate, isocyanatoethylmethacrylate, 2-butene-1,4-diol, 1-butene-3,4-diol, hydroxyethylmethacrylate, hydroxypropyl acrylate, methyl methacrylate, acrylic and methacrylic acid, methacroyl chloride, glycidyl methacrylate and allyl glycidyl ether. If a polycarboxylic acid or anhydride is employed, it is preferred to react the unsaturated polyol with an alkylene oxide. The polyol for preparing the macromer preferably has a hydroxyl functionality of at least 2.

A preferred macromer has been described in WO99/40144. Such macromer is suitable as a stabiliser precursor in a polymer polyol, and has been prepared by a process which comprises reacting a polyol with a cyclic dicarboxylic acid anhydride not containing any polymerizable double bond, and subsequently reacting the adduct thus obtained with an epoxide compound containing a polymerizable double bond. The polyol preferably is sorbitol or a mixture of sorbitol with one or more diols (including water), said sorbitol or said mixture having reacted with a mixture of propylene oxide and ethylene oxide. The cyclic dicarboxylic acid anhydride preferably is phthalic anhydride. The epoxide compound preferably is glycidyl methacrylate or glycidyl acrylate. The adduct can first partly be reacted with a di- or higher functional epoxide compound before being reacted with the epoxide compound containing a polymerizable double bond. Further, the polyol can be reacted with a di- or higher functional isocyanate compound preceding the reaction between the polyol and the cyclic dicarboxylic acid anhydride. A method for preparing the macromer comprises reacting the adduct first partly with the epoxide compound containing a polymerizable double bond and subsequently reacting the reaction product thus obtained with a di- or higher functional epoxide compound or a di- or higher functional isocyanate compound.

The macromer preferably has a nominal molecular weight of at least 4000, preferably in the range of from 5000 to 50,000.

The amount of ethylenically unsaturated monomers present when preparing the polymer polyol can vary widely. At any time when preparing the polymer polyol, the amount of ethylenically unsaturated monomer will generally differ between of from 0 to 60% by weight based on total weight of base polyol, polymer, monomer(s) and optionally macromer. It is possible to have all base polyol fed initially, while it is also possible to add the majority of the base polyol after initiation of polymerization.

The additional base polyol optionally added after initiation of polymerization can be the same or can be different from the base polyol as initially fed. Preferably, the base polyol remains the same.

The polymerization initiator is usually applied in an amount of from 0.01 to 5% by weight based on total weight of monomers. Suitable polymerization initiators are known in the art and include both peroxide compounds and azo compounds. Examples of peroxides are dibenzoyl peroxide, lauroyl peroxide, t-butyl hydroperoxide, benzoyl peroxide and di-t-butyl peroxide. Examples of suitable azo compounds are azobis(isobutyronitrile) (AIBN) and azobis(2-methylbutyronitrile) (AMBN).

Chain transfer agents may also be added to or be present in the polymerization reaction medium. Preferably, they are fed to the reactor in the initial phase of the present process. The use of chain transfer agents and their nature is known in the art. Chain transfer agents enable a control of the molecular weight and/or the cross-linking occurring between the various polymer molecules and hence may affect stability of the polymer polyol. If used at all, a chain transfer agent is suitably used in an amount of from 0.1 to 20% by weight, more suitably 0.2 to 10% by weight, and most suitably 0.3 to 5% by weight, based on total weight of end product. Examples of suitable chain transfer agents are 1-butanol, 2-butanol, isopropanol, ethanol, methanol, cyclohexane and mercaptans, such as dodecanethiol, ethanethiol, 1-heptanethiol, 2-octanethiol and toluenethiol. Preferably, isopropanol is used as a chain transfer agent.

Other compounds, such as compounds facilitating mixing of the various components, compounds which have a viscosity-lowering effect and/or compounds which enable one or more of the components used to better dissolve in the reaction medium may also be applied. An example of a compound having a viscosity-lowering effect, thus enabling a better mixing of the components, is toluene. Auxiliaries like toluene can be present in the feed and/or in the reactor.

The present invention also relates to a process for preparing a polymer polyol, comprising mixing in a reactor vessel, a base polyol, one or more ethylenically unsaturated monomers, a polymerization initiator, optionally a macromer, and optionally a chain transfer agent, and polymerizing the mixture thus obtained at a temperature of 50 to 200° C., wherein after discharging the reactor vessel content, fouling on the interior surface of the reactor vessel walls and/or any internals present in the reactor vessel is removed by contacting said fouling with an aqueous solution of a guanidine of formula

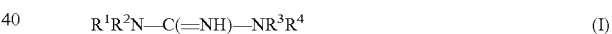

$R^1R^2N-C(=NH)-NR^3R^4$ (I)

wherein $R^1$, $R^2$, $R^3$ and $R^4$ may be the same or different and each of $R^1$, $R^2$, $R^3$ and $R^4$ is hydrogen or hydrocarbyl. All of the above-described embodiments and preferences also apply to this specific process for preparing a polymer polyol.

Thus, in the present invention as described in the above embodiments, a guanidine of formula

$R^1R^2N-C(=NH)-NR^3R^4$ (I)

is used as part of an aqueous solution, wherein $R^1$, $R^2$, $R^3$ and $R^4$ may be the same or different and each of $R^1$, $R^2$, $R^3$ and $R^4$ is hydrogen or hydrocarbyl. Preferably, $R^1$, $R^2$, $R^3$ and $R^4$ are the same. Further, preferably, the hydrocarbyl group is an aryl group or a linear or cyclic alkyl group, preferably a linear or cyclic $C_1$ to $C_{10}$ alkyl group, more preferably a linear or cyclic $C_1$ to $C_6$ alkyl group, and most preferably methyl. Most preferably, the guanidine to be used in the present invention is tetramethyl guanidine or N,N,N',N'-tetramethyl guanidine or 1,1,3,3-tetramethyl guanidine (TMG), i.e. a compound of formula (I) wherein all of $R^1$, $R^2$, $R^3$ and $R^4$ are methyl.

Preferably, said guanidine compound of formula $R^1R^2N-C(=NH)-NR^3R^4$ is not guanidine, that is to say not a guanidine compound of formula $R^1R^2N-C(=NH)-NR^3R^4$ wherein all of $R^1$, $R^2$, $R^3$ and $R^4$ are hydrogen.

The concentration of the guanidine in the aqueous solution containing it, is not essential. It may be of from 0.1 to 99.9 wt. %, 0.1 to 50 wt. %, 0.1 to 25 wt. %, 0.1 to 10 wt. %, 0.1 to 5 wt. %, 0.1 to 3 wt. %, 0.2 to 2 wt. % or 0.3 to 1 wt. %, as based on total weight of the solution.

The absolute effective amount of guanidine needed to remove the fouling can be determined by any skilled person and is dependent on the amount of fouling to be removed. The more fouling is to be removed the higher the amount of the guanidine should be. The same is valid for the time period of performing the present invention. The more fouling is to be removed the longer the time period for contacting the fouling with the aqueous solution containing the guanidine should be.

In a case where the fouling is to be removed in a reactor vessel, the reactor vessel is preferably filled with the aqueous solution containing the guanidine to such extent that all of said fouling is contacted with said solution. Preferably, stirring is performed while performing the present invention.

The temperature of the aqueous solution containing the guanidine during the treatment of the present invention, may be of from 20 to lower than 100° C., preferably 50 to lower than 100° C. and more preferably 70 to lower than 100° C.

In addition to water, a cosolvent may be used in the aqueous solution containing the guanidine used in the present invention, such as for example acetone. Further, the treatment of the present invention may be preceded by one or more washings with another cleaning agent, such as for example acetone.

The invention is further illustrated by the following Examples.

EXAMPLES

A polymer polyol was prepared by applying the following procedure, wherein the following compounds were used:

Base polyol=a polyether polyol containing randomly distributed ethyleneoxy and propyleneoxy monomers in the weight ratio of about 11/89. It is produced by using glycerol as the initiator and potassium hydroxide (KOH) as the catalyst. The base polyol has a weight average molecular weight of about 3,000 and has a OH value of about 54 mg KOH/g.

Styrene and acrylonitrile=ethylenically unsaturated monomers.

AMBN=azobis(2-methylbutyronitrile) (polymerization initiator).

Macromer=a polyol (in accordance with WO99/40144) having the following structure:

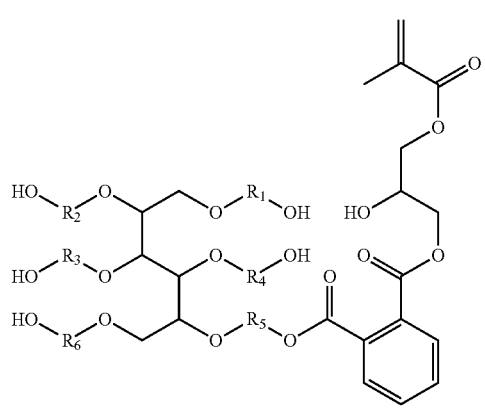

wherein $R_1$ to $R_6$ represent chains comprising randomly distributed propylene oxide (PO) and ethylene oxide (EO) monomers. The weight ratio of PO to EO in these chains is about 82/18. The weight average molecular weight per chain, averaged over all six chains, amounts to about 2,000.

IPA=isopropanol (chain transfer agent).

A two litre glass pressure reactor fitted with a heater, a stirrer, a thermocouple and inlet and outlet means, was charged with 401 g of base polyol, 84 g of macromer and 92 g of IPA. The reactor content was then heated to 45° C., at which temperature 18 g of styrene and 8 g of acrylonitrile were added. Then the reactor content was made oxygen free by vacuum/nitrogen cycles, and the temperature was increased to 100° C. 767 g of base polyol, 639 g of styrene, 304 g of acrylonitrile and 9 g of AMBN were premixed. The latter mixture was added as a feedstream to the reactor over a period of 2.5 hours. The reaction temperature was maintained at 100° C. Upon completion of the addition, the reaction product was held at reaction temperature for 30 minutes and was subsequently stripped of residual monomers for 3 hours at 120° C. under vacuum/nitrogen bubbling through.

Then the reactor content was cooled to room temperature and finally discharged. The reactor was then filled with 700 ml of acetone and the inside of the reactor was washed (by stirring) for 4 hours. The heel, which comprises polymer polyol product that remains behind in the reactor after discharging its content, became dissolved in the acetone. Further, fouling adhered to the interior surface of the reactor walls and the internals present in the reactor became dissolved in the acetone. Finally, the reactor content was discharged.

The procedure comprising first reaction and then washing with acetone was repeated multiple times. After about more than 100 times, it was visually observed that the interior surface of the reactor walls and the internals became coated with a layer of mat, insoluble fouling. The thickness of this coating increased after each repetition.

It was tested whether any other solvent could remove said apparently insoluble coating. As also indicated in the table below, it appeared that by washing with 700 ml of N-methyl-pyrrolidinone for 4 hours said coating was not removed. Neither was such removal accomplished by washing with 700 ml of propylene carbonate for 4 hours.

Surprisingly, however, it was found that by washing the inside of the reactor with a solution of TMG (1,1,3,3-tetramethyl guanidine) in water, the coating became detached from the interior surface of the reactor walls and from the internals. This loose coating could then simply by discarded by discharging the reactor content. After this treatment with TMG no fouling on the interior surface of the reactor walls and on the internals was visible anymore.

In specific, said treatment with TMG consisted of washing the inside of the reactor for 4 hours with a solution consisting of 60 g of TMG, 60 g of water and 480 g of acetone, and adding an additional 85 g of water and continuing the washing for 2 hours. This resulted in some loose coating. After discharging the reactor content, the inside of the reactor was washed again for 4 hours with a solution consisting of 5 g of TMG and 700 g of water (0.7 wt. % solution). This resulted in removal of all of the coating.

| Cleaning agent | All coating detached/removed? |
|---|---|
| acetone | no |
| N-methyl-pyrrolidinone | no |
| propylene carbonate | no |
| TMG solution in water | yes |

TMG = 1,1,3,3-tetramethyl guanidine

What is claimed is:

1. A process for removing fouling on a surface, comprising contacting the surface with an aqueous solution of a guanidine of formula $$R^1R^2N—C(=NH)—NR^3R^4 \quad (I)$$

wherein $R^1$, $R^2$, $R^3$ and $R^4$ may be the same or different and each of $R^1$, $R^2$, $R^3$ and $R^4$ is hydrogen or hydrocarbyl and the fouling is produced in a process wherein a dispersion of a solid material in a liquid is used and/or formed.

2. A process according to claim 1, wherein $R^1$, $R^2$, $R^3$ and $R^4$ in formula (I) for the guanidine are the same and are a linear or cyclic $C_1$ to $C_{10}$ alkyl group.

3. A process according to claim 2, wherein $R^1$, $R^2$, $R^3$ and $R^4$ are methyl.

4. A process according to claim 1, wherein the fouling is produced in a process for preparing a polymer polyol.

5. A process according to claim 4, wherein the polymer polyol is prepared by mixing a base polyol, one or more ethylenically unsaturated monomers, a polymerization initiator, optionally a macromer, and optionally a chain transfer agent, and polymerizing the mixture thus obtained at a temperature of 50 to 200° C.

6. A process according to claim 5, wherein the base polyol has a nominal molecular weight in the range of from 350 to 15,000 and an average nominal functionality (Fn) of at least 2.0.

7. A process according to claim 5, wherein the ethylenically unsaturated monomers are styrene and acrylonitrile in a weight ratio of from 30:70 to 100:0.9.

8. A process according to claim 5, wherein a macromer is used and the macromer is obtained by reacting a polyol with a cyclic dicarboxylic acid anhydride not containing any polymerizable double bond, and subsequently reacting the adduct thus obtained with an epoxide compound containing a polymerizable double bond.

9. A process according to claim 8, wherein the cyclic dicarboxylic acid anhydride is phthalic anhydride.

10. A process for preparing a polymer polyol, comprising mixing in a reactor vessel, a base polyol, one or more ethylenically unsaturated monomers, a polymerization initiator, optionally a macromer, and optionally a chain transfer agent, and polymerizing the mixture thus obtained at a temperature of 50 to 200° C., wherein after discharging the reactor vessel content, fouling on the interior surface of the reactor vessel walls and/or any internals present in the reactor vessel is removed by contacting said fouling with an aqueous solution of a guanidine of formula $$R^1R^2N—C(=NH)—NR^3R^4 \quad (I)$$

wherein $R^1$, $R^2$, $R^3$ and $R^4$ may be the same or different and each of $R^1$, $R^2$, $R^3$ and $R^4$ is hydrogen or hydrocarbyl.

* * * * *